United States Patent [19]
Pinsley

[11] 3,984,784
[45] Oct. 5, 1976

[54] EXPANDER OPEN CYCLE GAS DYNAMIC LASER

[75] Inventor: Edward A. Pinsley, North Palm Beach, Fla.

[73] Assignee: United Technologies Corporation, Hartford, Conn.

[22] Filed: Dec. 19, 1974

[21] Appl. No.: 534,406

[52] U.S. Cl. ............................ 331/94.5 G; 330/4.3; 331/94.5 T
[51] Int. Cl.² ........................................ H01S 3/22
[58] Field of Search ................. 331/94.5 G, 94.5 P; 330/4.3

[56] References Cited
UNITED STATES PATENTS

| | | | |
|---|---|---|---|
| 3,648,194 | 3/1972 | Melikian et al. | 331/94.5 G |
| 3,886,477 | 5/1975 | Ruby et al. | 331/94.5 G |
| 3,886,478 | 5/1975 | Milling | 331/94.5 G |

FOREIGN PATENTS OR APPLICATIONS

| | | | |
|---|---|---|---|
| 1,338,801 | 11/1973 | United Kingdom | 331/94.5 P |

Primary Examiner—Robert J. Webster
Attorney, Agent, or Firm—Jack N. McCarthy

[57] ABSTRACT

This device includes an expander open cycle gas dynamic laser wherein the majority of the gas dynamic laser flow is recirculated while a fraction of the flow is removed in a boundary layer bleed removal system. This device includes a combustor for providing the proper gas constituents which then flow downstream of a nozzle means in a laser cavity to permit lasing to occur. The flow from the lasing cavity is directed into a diffuser which in turn directs its flow into the inlet of a compressor after flowing over a heat exchanger which cools the flow. One heat exchanger is in the bleed flow while the other is in the flow from the diffuser. The flow from the compressor is directed into the combustor.

4 Claims, 1 Drawing Figure

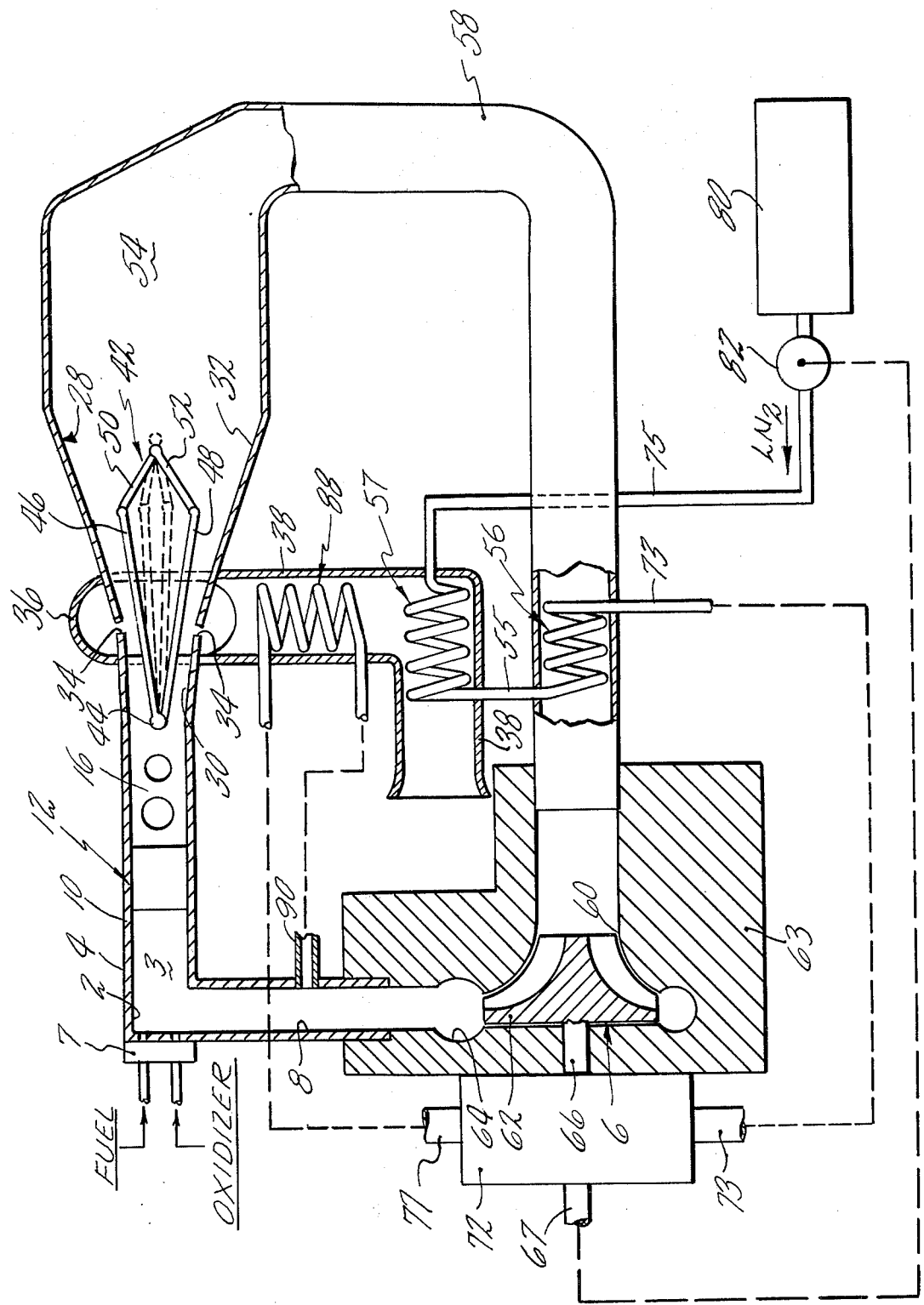

3,984,784

EXPANDER OPEN CYCLE GAS DYNAMIC LASER

BACKGROUND OF THE INVENTION

This invention relates to gas dynamic lasers and relates to overall devices for returning gas flow in a closed loop. While a fraction of the flow is discharged overboard, a majority of the flow is recirculated. Application Ser. No. 772,072, filed Oct. 29, 1968 for a CLOSED CYCLE DEVICE and Application Ser. No. 336,000, filed Feb. 26, 1973 for a CLOSED CYCLE GAS DYNAMIC LASER contain background material.

SUMMARY OF THE INVENTION

A primary object of the present invention is to provide an expander open cycle system for a gas dynamic laser in which a portion of the flow therein is discharged overboard while the majority of the laser flow is recirculated, with a combustor being positioned in the flow cycle where the energy losses in the bleed flow removal, in laser power extraction and in heat transfer are made up. The total mass flow added of $N_2$, fuel and oxidizer must equal the bleed flow for steady-state operation.

In accordance with the present invention nitrogen, which constitutes the major component of the laser flow mixture, is added to the system by passing it through heat exchangers in the cycle flow to pick up heat, passing it through a turbine to drive a compressor, which compresses the gas to overcome the overall pressure losses in the cycle, then directing it into the cycle, typically at the inlet to the compressor.

BRIEF DESCRIPTION OF THE DRAWING

The FIGURE is a schematic view of an expander open cycle system.

DESCRIPTION OF THE PREFERRED EMBODIMENT

As shown in the FIGURE the expander open cycle system is set forth wherein the majority of the gas dynamic laser flow is recirculated in a closed loop. A combustor 2 containing a combustion region 3 is located in a housing 4. An injector 7 fixed to housing 4 provides the fuel and oxidizer reactants to maintain combustion in region 3. A connecting manifold 10 directs the working fluid from the combustion region 2 to a nozzle means 12. A nozzle means of this type showing a plurality of small nozzles is disclosed in U.S. Pat. No. 3,602,432. The fluid is then expanded to supersonic velocity through the nozzle means 12 to a laser cavity 16 which is downstream of the exit of the nozzle means.

The lasing cavity, or region 16 includes reflecting means to provide either self-oscillation or amplification of a low-power laser beam directed thereinto by another gas laser device.

Many types of reflecting means can be used to obtain multiple beam passes through the laser cavity. An aerodynamic or material window is provided to permit the beam to exit from the lasing cavity 16 since the static pressure of the laser flow will be less than atmospheric. An aerodynamic window of the type referred to is disclosed in U.S. Pat. No. 3,604,789.

The lasing fluid then passes through a supersonic diffuser 28 formed having first diverging walls 30 and second diverging walls 32 where a fraction thereof, approximately one-third, is removed by boundary layer bleed opening means 34 which is provided along the walls of the diffuser where the boundary layer may be expected to separate. The opening means 34 is connected by a manifold 36 and duct 38 to atmosphere. Contouring of the boundary layer bleed duct walls of the diffuser 28 including the edges adjacent the bleed opening means 34, and boundary layer energization methods can be used to obtain adequate pressure recovery in the boundary layer removal manifold 36 and duct 38.

A movable centerbody 42 is located in the diffuser having a fixed nose 44 with movable sides 46, 48, 50 and 52 forming a converging-diverging flow passage. Control means not shown moves the centerbody between its expanded (solid lines) position and its contracted (dotted lines) position. It can be seen that the narrow part of the diffuser moves from a point adjacent the intersection of the diverging wall 30 and exit of the lasing cavity to a point adjacent the intersection of the diverging walls 30 and 32 when the centerbody moves from a contracted position to an expanded position. The centerbody is positioned in its contracted position for starting the flow through the closed loop and it is moved to its expanded position for its designed flow. In addition to this means for changing the area of the diffuser, the area may be varied by translating the body, or plug, 42, or by moving the outer diffuser walls, 30 and 32.

The flow from the diffuser 28 enters the manifold 54 and is directed to the inlet 60 of a compressor 6 by conduit means 58. A heat exchanger 56 is located in the conduit means 58 and a heat exchanger 57 is located in the duct 38 to cool the fluid in the conduit means 58 and heat the fluid in the heat exchangers 56 and 57. These heat exchangers 56 and 57 are connected in series by a conduit 55. Liquid nitrogen is contained in a container 80 and pumped at a high pressure by a pump 82 to the inlet of heat exchanger 57 through a conduit 75, hot high pressure nitrogen is directed to the inlet of a turbine 72 from the outlet of the heat exchanger 56 by a conduit 73.

Expansion turbine 72 has two drive shafts 66 and 67. Shaft 66 is connected to an impeller 62 of compressor 6 which is mounted for rotation in a housing 63, and shaft 67 is connected to pump 82. The outlet of the compressor 6 is connected to a manifold 64 which exits into a conduit means 8. Conduit means 8 directs its flow into the combustor 2.

The exit of the turbine 72 is connected through conduit 77 to a heat exchanger 88 formed as a part thereof. This heat exchanger 88 is located in the duct 38 between the heat exchanger 57 and manifold 36. This heat exchanger 88 will further heat a fluid passing through conduit 77. The flow leaving the heat exchanger will pass through conduit 90. Conduit 90 is connected at its other end to conduit means 8. For differing cycle design parameters (such as allowable compressor exit temperatures) it may be desirable to inject the flow from conduit 90 upstream of the inlet 60 of the compressor 6. In this case, conduit 90 would be connected to conduit means 58 downstream of the heat exchanger 56.

The connecting manifold 10 providing the connection from the combustor 2 to the nozzle means, the nozzle means 12 and the laser cavity 16 are similar to those known in the art except that the operation parameters are optimized for expander cycle operation.

As described above, laser power extraction is performed in the laser cavity by optical systems which are well-known in the art.

In the boundary layer bleed removal arrangement shown, the fraction of flow removed would amount to approximately one-third of the total flow entering the diffuser 28. This bleed flow is discharged overboard and may be removed by other known methods as well as the arrangement shown in the FIGURE and described herein. It is necessary that the boundary layer removal is done in such a manner as to aid the pressure recovery of the supersonic diffuser.

The nitrogen which is heated by the loop fluid exiting from the supersonic diffuser 28 to a high temperature is expanded through the driving turbine 72 to a pressure slightly higher than the pressure in conduit 8. If conduit means 90 is connected to conduit 58, then the exhaust pressure of the turbine 72 need only be slightly higher than the inlet pressure of the compressor 6.

Fuel (such as CO, benzene, $C_2N_2$ and some hydrogen or hydrocarbon) and an oxidizer (such as $O_2$, $N_2O$ or $N_2O_4$) are injected through the injector 6 into the combustion region 2 to make up enthalpy removed. The total mass flow of fluids $N_2$, fuel and oxidizer must equal the bleed flow for steady-state operation.

The fuel and oxidizer flow rates are adjusted, so that when combined with the flow exiting from the compressor, they provide a lasing gas having the proper composition, gas temperature and pressure such that after passing through the nozzle means 12, a population inversion will be achieved between the energy levels of one of the constituents of the lasing gas mixture. A lasing gas for this device could consist of carbon dioxide, nitrogen and water vapor in the composition ratio 14% $CO_2$, 85% $N_2$ and 1% $H_2O$, but this system is not limited to this gas composition. Cycle pressure and temperature can be controlled readily by adjusting the bleed flow, by allowing some of the nitrogen to bypass the heat exchanger, or by changing the relative mass flow of the various reactants and turbine drive fluid. Control means well-known in the art can be used to obtain high cycle efficiency and to permit flexibility in achieving proper composition and temperature conditions in the combustion region throughout the cycle transients during start.

While flow through heat exchangers 57 and 88 is shown flowing in the same direction with the flow in duct 38, and the flow in heat exchanger 56 is shown having a counterflow to the flow in conduit means 58, it is to be understood that the flow relationship can be changed in any of the heat exchangers to provide a desired cycle performance. In some instances, it may be desirable to use a multistage turbine with inner stage reheating since enough enthalpy is available in the loop fluid.

I claim:

1. A gas dynamic laser device having a continuous gas flow path therein comprising, a combustor, said combustor having a combustion region, said combustion region being connected to a supersonic nozzle means, a lasing region located downstream of said nozzle means, reflecting means in said lasing region to form a lasing cavity, diffuser means located downstream of said lasing region, said diffuser means having means for removing a portion of the gas flow passing therethrough, a compressor means, conduit means for directing the remainder of said flow from said diffuser to the inlet of said compressor means, the exit of said compressor means being connected to said combustor, turbine means for driving said compressor means, said means for removing a portion of the gas flow including a manifold connected to said diffuser means, said manifold having a duct leading to the exterior of the laser device, means for directing a diluent fluid into said gas flow, heat exchanger means, said heat exchanger means being located in the lasing gas downstream from the diffuser, said heat exchanger means cooling the lasing gas and heating the diluent fluid, means for directing the heated diluent fluid from said heat exchanger means to the inlet of the turbine means for driving said turbine means, said turbine means having an exit being connected to said laser device for directing the diluent fluid into said gas flow.

2. A combination as set forth in claim 1 wherein a manifold is located around the diffuser means for removing a portion of the flow passing therethrough, said manifold having a duct leading to the exterior of the laser device, the exit of said turbine means is connected to the cycle by second conduit means, said second conduit means including a heat exchanger means located in said duct to further aid in heating the diluent fluid.

3. A combination as set forth in claim 1 wherein the means for directing a diluent fluid into said cycle includes a pump means, said pump means being driven by said turbine means.

4. A combination as set forth in claim 2 wherein said second conduit means is connected into said cycle at a point between the exit of said compressor means and combustor.

* * * * *